United States Patent [19]

Owen

[11] Patent Number: 5,248,408
[45] Date of Patent: Sep. 28, 1993

[54] CATALYTIC CRACKING PROCESS AND APPARATUS WITH REFLUXED SPENT CATALYST STRIPPER

[75] Inventor: Hartley Owen, Belle Mead, N.J.
[73] Assignee: Mobil Oil Corporation, Fairfax, Va.
[21] Appl. No.: 674,241
[22] Filed: Mar. 25, 1991
[51] Int. Cl.$^5$ .................. C10G 11/02; C10G 11/04; B01J 8/18; F27B 15/00
[52] U.S. Cl. .................. 208/113; 208/120; 502/41; 502/44; 422/143; 422/144; 422/145; 422/146; 422/147
[58] Field of Search .............. 208/113, 120; 502/41, 502/44; 422/143, 144, 145, 146, 147

[56] References Cited

U.S. PATENT DOCUMENTS

| | | | |
|---|---|---|---|
| 4,787,967 | 11/1988 | Herbst et al. | 208/113 |
| 4,917,790 | 4/1990 | Owen | 208/113 |
| 5,000,841 | 3/1991 | Owen | 208/113 |

Primary Examiner—Theodore Morris
Assistant Examiner—P. C. Hailey
Attorney, Agent, or Firm—Alexander J. McKillop; Malcolm D. Keen; Richard D. Stone

[57] ABSTRACT

A fluidized catalytic cracking process and apparatus operates with a single or multi- stage refluxed catalyst stripper. Recycle, or reflux, of stripped catalyst to the stripping zone improves stripping. Preferably, a two stage hot stripper is used. Addition of regenerated catalyst to spent catalyst from the reactor heats spent catalyst in a first stripping stage, which preferably uses stripping steam. Catalyst from the first stripping stage passes up through a second stage stripping zone with a heat removal means, e.g., a stab-in tube bundle. Steam or flue gas fluidizes catalyst, improves heat transfer and strips the catalyst. Some catalyst from the second stage stripper is preferably recycled to the inlet to the first stripping stage. Additional hot regenerated catalyst may be added downstream of the first catalyst stage to heat the second stripping stage, added to catalyst removed from the primary stripping zone which is sent to the regeneration zone.

23 Claims, 1 Drawing Sheet

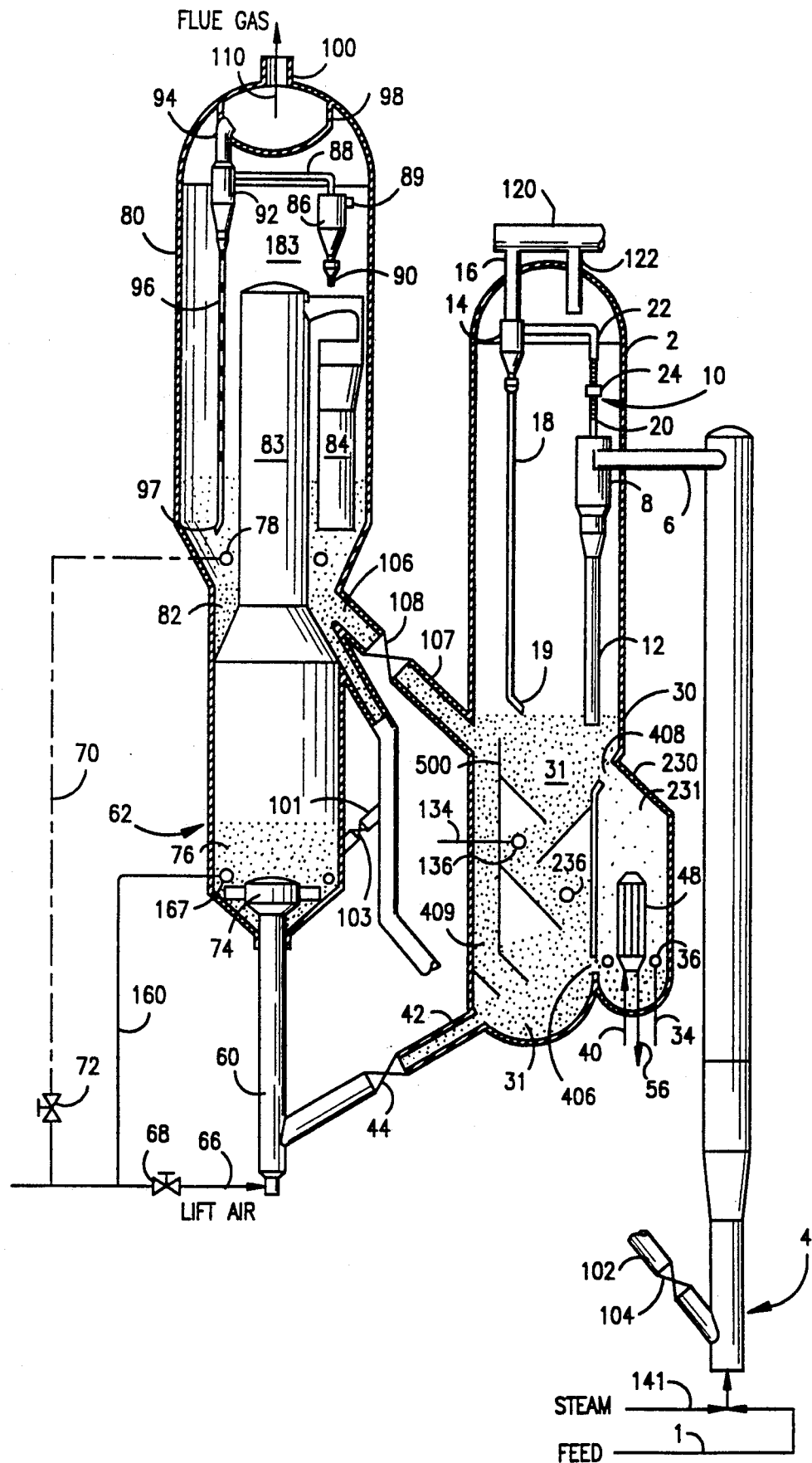

CATALYTIC CRACKING PROCESS AND APPARATUS WITH REFLUXED SPENT CATALYST STRIPPER

BACKGROUND OF THE INVENTION

1. Field of the Invention

The field of the invention is the fluidized catalytic cracking process in general and catalyst stripping in particular.

2. Description of Related Art

Catalytic cracking is the backbone of many refineries. It converts heavy feeds into lighter products by catalytically cracking large molecules into smaller molecules. Catalytic cracking operates at low pressures, without hydrogen addition, in contrast to hydrocracking, which operates at high hydrogen partial pressures. Catalytic cracking is inherently safe as it operates with very little oil actually in inventory during the cracking process.

There are two main variants of the catalytic cracking process: moving bed and the far more popular and efficient fluidized bed process.

In the fluidized catalytic cracking (FCC) process, catalyst, having a particle size and color resembling table salt and pepper, circulates between a cracking reactor and a catalyst regenerator. In the reactor, hydrocarbon feed contacts a source of hot, regenerated catalyst. The hot catalyst vaporizes and cracks the feed at 425° C.–600° C., usually 460° C.–560° C. The cracking reaction deposits carbonaceous hydrocarbons or coke on the catalyst, thereby deactivating the catalyst. The cracked products are separated from the coked catalyst. The coked catalyst is stripped of volatiles, usually with steam, in a catalyst stripper and the stripped catalyst is then regenerated. The catalyst regenerator burns coke from the catalyst with oxygen containing gas, usually air. Decoking restores catalyst activity and simultaneously heats the catalyst to, e.g., 500°0 C.–900° C., usually 600° C.–750° C. This heated catalyst is recycled to the cracking reactor to crack more fresh feed. Flue gas formed by burning coke in the regenerator may be treated for removal of particulates and for conversion of carbon monoxide, after which the flue gas is normally discharged into the atmosphere.

Catalytic cracking is endothermic, it consumes heat. The heat for cracking is supplied at first by the hot regenerated catalyst from the regenerator. Ultimately, it is the feed which supplies the heat needed to crack the feed. Some of the feed deposits as coke on the catalyst, and the burning of this coke generates heat in the regenerator, which is recycled to the reactor in the form of hot catalyst.

Catalytic cracking has undergone progressive development since the 40s. The trend of development of the fluid catalytic cracking (FCC) process has been to all riser cracking and use of zeolite catalysts.

Riser cracking gives higher yields of valuable products than dense bed cracking. Most FCC units now use all riser cracking, with hydrocarbon residence times in the riser of less than 10 seconds, and even less than 5 seconds.

Zeolite-containing catalysts having high activity and selectivity are now used in most FCC units. These catalysts work best when coke on the catalyst after regeneration is less than 0.1 wt %, and preferably less than 0.05 wt %.

To regenerate FCC catalysts to these low residual carbon levels, and to burn CO completely to $CO_2$ within the regenerator (to conserve heat and minimize air pollution) many FCC operators add a CO combustion promoter metal to the catalyst or to the regenerator.

U.S. Pat. Nos. 4,072,600 and 4,093,535, which are incorporated by reference, teach use of combustion-promoting metals such as Pt, Pd, Ir, Rh, Os, Ru and Re in cracking catalysts in concentrations of 0.01 to 50 ppm, based on total catalyst inventory.

As the process and catalyst improved, refiners attempted to use the process to upgrade a wider range of feedstocks, in particular, feedstocks that were heavier, and also contained more metals and sulfur than had previously been permitted in the feed to a fluid catalytic cracking unit.

These heavier, dirtier feeds have placed a growing demand on the regenerator. Processing resids has exacerbated four existing problem areas in the regenerator, sulfur, steam, temperature and NOx. These problems will each be reviewed in more detail below.

SULFUR

Much of the sulfur in the feed ends up as SOx in the regenerator flue gas. Higher sulfur levels in the feed, combined with a more complete regeneration of the catalyst in the regenerator increases the amount of SOx in the regenerator flue gas. Some attempts have been made to minimize the amount of SOx discharged to the atmosphere through the flue gas by including catalyst additives or agents to react with the SOx in the flue gas. These agents pass with the regenerated catalyst back to the FCC reactor where the reducing atmosphere releases the sulfur compounds as H2S. Suitable agents are described in U.S. Pat. Nos. 4,071,436 and 3,834,031. Use of cerium oxide agent for this purpose is shown in U.S. Pat. No. 4,001,375.

Unfortunately, the conditions in most FCC regenerators are not the best for SOx adsorption. The high temperatures in modern FCC regenerators (up to 870° C. (1600° F.)) impair SOx adsorption. One way to minimize SOx in flue gas is to pass catalyst from the FCC reactor to a long residence time steam stripper, as disclosed in U.S. Pat. No. 4,481,103 to Krambeck et al which is incorporated by reference. This process preferably steam strips spent catalyst at 500°–550° C. (932° to 1022° F.), which is beneficial but not sufficient to remove some undesirable sulfur- or hydrogen-containing components.

STEAM

Steam is always present in FCC regenerators although it is known to cause catalyst deactivation. Steam is not intentionally added, but is invariably present, usually as adsorbed or entrained steam from steam stripping or catalyst or as water of combustion formed in the regenerator.

Poor stripping leads to a double dose of steam in the regenerator, first from the adsorbed or entrained steam and second from hydrocarbons left on the catalyst due to poor catalyst stripping. Catalyst passing from an FCC stripper to an FCC regenerator contains hydrogen-containing components, such as coke or unstripped hydrocarbons adhering thereto. This hydrogen burns in the regenerator to form water and cause hydrothermal degradation.

U.S. Pat. No. 4,336,160 to Dean et al, which is incorporated by reference, attempts to reduce hydrothermal degradation by staged regeneration. However, the flue gas from both stages of regeneration contains SOx which is difficult to clean. It would be beneficial, even in staged regeneration, if the amount of water precursors present on stripped catalyst was reduced.

Steaming of catalyst becomes more of a problem as regenerators get hotter. Higher temperatures greatly accelerate the deactivating effects of steam.

TEMPERATURE

Regenerators are operating at higher and higher temperatures. This is because most FCC units are heat balanced, that is, the endothermic heat of the cracking reaction is supplied by burning the coke deposited on the catalyst. With heavier feeds, more coke is deposited on the catalyst than is needed for the cracking reaction. The regenerator gets hotter, and the extra heat is rejected as high temperature flue gas. Many refiners severely limit the amount of resid or similar high CCR feeds to that amount which can be tolerated by the unit. High temperatures are a problem for the metallurgy of many units, but more importantly, are a problem for the catalyst. In the regenerator, the burning of coke and unstripped hydrocarbons leads to much higher surface temperatures on the catalyst than the measured dense bed or dilute phase temperature. This is discussed by Occelli et al in Dual-Function Cracking Catalyst Mixtures, Ch. 12, Fluid Catalytic Cracking, ACS Symposium Series 375, American Chemical Society, Washington, D.C., 1988.

Some regenerator temperature control is possible by adjusting the CO/CO2 ratio produced in the regenerator. Burning coke partially to CO produces less heat than complete combustion to CO2. However, in some cases, this control is insufficient, and also leads to increased CO emissions, which can be a problem unless a CO boiler is present.

U.S. Pat. No. 4,353,812 to Lomas et al, which is incorporated by reference, discloses cooling catalyst from a regenerator by passing it through the shell side of a heat-exchanger with a cooling medium through the tube side. The cooled catalyst is recycled to the regeneration zone. This approach will remove heat from the regenerator, but will not prevent poorly, or even well, stripped catalyst from experiencing very high surface or localized temperatures in the regenerator. The Lomas process does not control the temperature of catalyst from the reactor stripper to the regenerator.

The prior art also used dense or dilute phase regenerated fluid catalyst heat removal zones or heat-exchangers that are remote from, and external to, the regenerator vessel to cool hot regenerated catalyst for return to the regenerator. Examples of such processes are found in U.S. Pat. Nos. 2,970,117 to Harper; 2,873,175 to Owens; 2,862,798 to McKinney; 2,596,748 to Watson et al; 2,515,156 to Jahnig et al; 2,492,948 to Berger; and 2,506,123 to Watson. In these processes the regenerator operating temperature is affected by the temperature of catalyst from the stripper.

NOX

Burning of nitrogenous compounds in FCC regenerators has long led to creation of minor amounts of NOx, some of which were emitted with the regenerator flue gas. Usually these emissions were not much of a problem because of relatively low temperature, a relatively reducing atmosphere from partial combustion of CO and the absence of catalytic metals like Pt in the regenerator which increase NOx production.

Many FCC units now operate at higher temperatures, with a more oxidizing atmosphere, and use CO combustion promoters such as Pt. These changes in regenerator operation reduce CO emissions, but usually increase nitrogen oxides (NOx) in the regenerator flue gas. It is difficult in a catalyst regenerator to completely burn coke and CO in the regenerator without increasing the NOx content of the regenerator flue gas, so NOx emissions are now frequently a problem.

Recent catalyst patents include U.S. Pat. No. 4,300,997 and its division U.S. Pat. No. 4,350,615, both directed to the use of Pd-Ru CO-combustion promoter. The bi-metallic CO combustion promoter is reported to do an adequate job of converting CO to CO2, while minimizing the formation of NOx.

U.S. Pat. No. 4,199,435 suggests steam treating conventional metallic CO combustion promoter to decrease NOx formation without impairing too much the CO combustion activity of the promoter.

Process modifications are suggested in U.S. Pat. No. 4,413,573 and U.S. Pat. No. 4,325,833 directed to two- and three-stage FCC regenerators, which reduce NOx emissions.

U.S. Pat. No. 4,313,848 teaches counter-current regeneration of spent FCC catalyst, without backmixing, to minimize NOx emissions.

U.S. Pat. No. 4,309,309 teaches the addition of a vaporizable fuel to the upper portion of a FCC regenerator to minimize NOx emissions. Oxides of nitrogen formed in the lower portion of the regenerator are reduced in the reducing atmosphere generated by burning fuel in the upper portion of the regenerator.

U.S. Pat. No. 4,235,704 suggests that too much CO combustion promoter causes NOx formation, and calls for monitoring the NOx content of the flue gases, and adjusting the concentration of CO combustion promoter in the regenerator based on the amount of NOx in the flue gas.

The approach taken in U.S. Pat. No. 4,542,114 is to minimize the volume of flue gas by using oxygen rather than air in the FCC regenerator, with consequent reduction in the amount of flue gas produced.

All the catalyst and process patents discussed above, directed to reducing NOx emissions, from U.S. Pat. No. 4,300,997 to U.S. Pat. No. 4,542,114, are incorporated herein by reference.

The reduction in NOx emissions achieved by the above approaches helps some but still may fail to meet the ever more stringent NOx emissions limits set by local governing bodies. Much of the NOx formed is not the result of combustion of N2 within the FCC regenerator, but rather combustion of nitrogen-containing compounds in the coke entering the FCC regenerator. Bimetallic combustion promoters are probably best at minimizing NOx formation from N2.

Unfortunately, the trend to heavier feeds usually means the amount of nitrogen compounds on the coke will increase and that NOx emissions will increase. Higher regenerator temperatures also tend to increase NOx emissions. It would be beneficial, in many refineries, to have a way to burn at least a large portion of the nitrogenous coke in a relatively reducing atmosphere, so that much of the NOx formed could be converted into N2 within the regenerator. Unfortunately, most existing regenerator designs can not operate efficiently at such conditions, i.e., with a reducing atmosphere.

It would be beneficial if a better stripping process were available which would permit increased recovery of valuable, strippable hydrocarbons. There is a need for a high temperature stripper, which will not increase the regenerator temperature. There is a special need to remove more hydrogen from spent catalyst to minimize hydrothermal degradation in the regenerator. It would be further advantageous to remove more sulfur-containing compounds from spent catalyst prior to regeneration to minimize SOx in the regenerator flue gas. Also, it would be advantageous to have a better way to control regenerator temperature.

Although quite a lot of work has been one on use of heat exchangers to control the FCC regenerator temperature, there have been some difficulties in implementation. Conditions are severe in FCC regenerators, and minor changes in operation, or sudden shutdowns, can damage a heat exchanger immersed in the regenerator, or associated with it. Temperatures in the regenerator are so high that if coolant flow of water or steam to a tube bundle is interrupted even momentarily, the thermal shock to the tube bundle when flow resumes can be enough to destroy the tubes. Isolation of the heat exchanger from the regenerator, and from sudden temperature swings, would be beneficial from a standpoint of insulating the tube bundle from thermal shock.

It would also be beneficial if the operation of high efficiency regenerators could be improved. These regenerators now require a fairly large recycle line transferring hot, regenerated catalyst from the second dense bed to the coke combustor. The large amount of recycle is needed to provide enough hot catalyst to "light off" the coke combustor, and to promote afterburning in the dilute phase transport riser. As these regenerators now operate, with spent catalyst and hot regenerated catalyst being dumped into the coke combustor, there is not much time for good mixing of hot regenerated catalyst with spent catalyst. Use of a riser mixer upstream of the coke combustor helps, in that it allows more time for hot and spent catalyst streams to come together, but I believe even further improvements could be made by providing significantly more time for relatively cool stripped catalyst to be heated by regenerated catalyst prior to regeneration. This would allow the catalyst charged to the regenerator to be made really hot. I did not want to achieve a high stripped catalyst preheat temperature entirely within the catalyst stripper. The steam atmosphere in the stripper makes extreme preheat of the spent catalyst by running an extremely hot stripper undesirable.

I have found a way to achieve much better stripping of coked FCC catalyst. My solution not only improves stripping, and increases the yield of valuable liquid product, it reduces the load placed on the catalyst regenerator, minimizes SOx emissions, and permits processing of more difficult feeds. Regenerator temperatures can be increased, reduced, or maintained constant while processing worse feeds, while the amount of hydrothermal deactivation of catalyst in the regenerator can be reduced.

In developing a solution to the rather specialized problems associated with improving strippers associated with heavy oil crackers, I also discovered a new way to strip spent catalyst, which is highly beneficial regardless of the nature of the feed to the FCC process. I was able to overcome most deficiencies of current spent catalyst strippers by refluxing the stripper, in a manner somewhat similar to refluxing a distillation column.

BRIEF SUMMARY OF THE INVENTION

Accordingly, the present invention provides a fluidized catalytic cracking process wherein a heavy hydrocarbon feed comprising hydrocarbons having a boiling point above about 650° F. is catalytically cracked to lighter products comprising the steps of: catalytically cracking said feed in a catalytic cracking reactor operating at catalytic cracking conditions by contacting feed with a source of hot regenerated catalyst to produce a cracking reactor effluent mixture comprising cracked products and spent catalyst containing coke and strippable hydrocarbons; separating said effluent mixture into a cracked product rich vapor phase and a solids rich phase comprising spent catalyst; stripping at least a portion of said solids rich phase in a catalyst stripping zone with stripping gas to remove strippable compounds and produce stripped catalyst; recycling at least a portion of said stripped catalyst to said catalyst stripping zone; regenerating at least a portion of said stripped catalyst in a catalyst regeneration means to produce regenerated catalyst which is recycled to said catalytic cracking reactor.

In another embodiment, the present invention provides a fluidized catalytic cracking process wherein a heavy hydrocarbon feed comprising hydrocarbons having a boiling point above about 650° F. is catalytically cracked to lighter products comprising the steps of: catalytically cracking said feed in a catalytic cracking reactor operating at catalytic cracking conditions by contacting said feed with a source of hot regenerated catalyst to produce a cracking reactor effluent mixture having an effluent temperature and comprising cracked products and spent cracking catalyst containing coke and strippable hydrocarbons; separating said cracking reactor effluent mixture into a cracked product rich vapor phase and a solids rich phase comprising said spent catalyst and strippable hydrocarbons, said solids rich phase having a temperature; heating said solids rich phase by mixing it with a source of hot regenerated catalyst having a higher temperature than said solids rich phase to produce a heated catalyst mixture comprising spent and regenerated catalyst having a catalyst mixture temperature intermediate said solids rich phase temperature and the temperature of the regenerated catalyst; stripping in a primary stripping stage said heated catalyst mixture and a stream of recycled, stripped catalyst with a stripping gas to remove strippable compounds from spent catalyst; passing from 10 to 90% of said catalyst mixture from said primary stripping stage to a catalyst regeneration means; passing the remainder of said catalyst mixture from from said primary stripping stage to a secondary stripping stage; stripping and cooling said catalyst mixture in said secondary stripping stage by fluidizing said catalyst mixture with a stripping gas and removing heat from said catalyst mixture by indirect heat exchange with a heat exchange means having a heat transfer coefficient and wherein the heat transfer coefficient for indirect heat exchange from said catalyst mixture across said heat exchange means is higher than a heat transfer coefficient across said indirect heat exchange means obtainable without the presence of added stripping gas in said secondary stripping stage, to produce a cooled, stripped catalyst mixture with a reduced content of strippable hydrocarbons and a secondary stripping vapor stream;

recycling said cooled, stripped catalyst mixture from said secondary stripping zone to the inlet to the primary stripping zone; regenerating said cooled, stripped catalyst mixture by contact with oxygen or an oxygen containing gas in said regeneration means to produce regenerated catalyst having a higher temperature than said catalyst mixture temperature as a result of combustion of coke on said spent catalyst; recycling to the cracking reactor a portion of the regenerated catalyst to crack more hydrocarbon feed; and recycling to the primary stripping stage a portion of the regenerated catalyst to heat spent catalyst.

In an apparatus embodiment, the present invention provides an apparatus for the fluidized catalytic cracking of a heavy hydrocarbon feed comprising hydrocarbons having a boiling point above about 650° F. to lighter products by contact said feed with catalytic cracking catalyst comprising: a catalytic cracking reactor means having an inlet connective with said feed and with a source of hot regenerated catalyst and having an outlet for discharging a cracking reactor effluent mixture comprising cracked products and spent cracking catalyst containing coke and strippable hydrocarbons; a separation means connective with said reactor outlet for separating said cracking reactor effluent mixture into a cracked product rich vapor phase and a solids rich phase comprising said spent catalyst and strippable hydrocarbons; a primary stripping means adapted to contain a relatively dense phase fluidized bed of catalyst beneath a dilute vapor phase in a primary stripping vessel comprising in an upper portion thereof an inlet for a source of hot regenerated cracking catalyst, an inlet for spent catalyst, and a vapor outlet for stripped hydrocarbons and stripping gas and in a lower portion thereof an inlet for a primary stripping gas and an outlet for discharge of stripped solids; a secondary stripping means comprising a vessel adapted to contain a fluidized bed of catalyst and having in a lower portion thereof an inlet for stripped solids connective with said solids outlet of said primary stripping means, and an inlet for a secondary stripping gas, an indirect heat exchange means adapted to be contained within said fluidized bed of catalyst in the secondary stripping vessel for removal of heat, and at least one outlet in an upper portion of said secondary stripping means for discharge of stripped catalyst and stripped hydrocarbons and secondary stripping gas and wherein at least a portion of said stripped catalyst from said secondary stripping means is refluxed to said primary stripping means; a catalyst regeneration means having an inlet connective with at least one catalyst outlet of said primary or said secondary stripping means, a regeneration gas inlet, a flue gas outlet, and an outlet for removal of hot regenerated catalyst; and a catalyst recycle means connective with said catalytic cracking reactor and with said outlet from said primary stripping zone.

In another apparatus embodiment, the present invention provides an apparatus for stripping spent fluidized catalytic cracking catalyst having a an average particle size within the range of 10-100 microns comprising a stripping means having an inlet in an upper portion thereof for spent cracking catalyst, an inlet in a lower portion thereof for stripping gas, an outlet in an upper portion thereof for a stripper effluent vapor, and an outlet in a lower portion thereof for stripped catalyst, characterized by a stripped catalyst recycle means adapted to recycle at least a portion of stripped catalyst removed from said stripping means back to said stripping means.

BRIEF DESCRIPTION OF THE DRAWING

The Figure is a simplified schematic view of an FCC unit with a hot stripper of the invention.

DETAILED DESCRIPTION

The present invention can be better understood by reviewing it in conjunction with the Figure, which illustrates a fluid catalytic cracking system of the present invention. Although a preferred FCC unit is shown, any riser reactor and regenerator can be used in the present invention. The stripper shown is a good deal more robust than conventional FCC strippers. The principal of refluxing the spent catalyst stripper is of broader application than as shown in the Figure, which illustrats a specific application where refluxing is put to good use.

A heavy feed is charged via line 1 to the lower end of a riser cracking FCC reactor 4. Hot regenerated catalyst is added via standpipe 102 and control valve 104 to mix with the feed. Preferably, some atomizing steam is added via line 141 to the base of the riser, usually with the feed. With heavier feeds, e.g., a resid, 2-10 wt.% steam may be used. A hydrocarbon-catalyst mixture rises as a generally dilute phase through riser 4. Cracked products and coked catalyst are discharged via riser effluent conduit 6 into first stage cyclone 8 in vessel 2. The riser top temperature, the temperature in conduit 6, ranges between about 480° and 615° C. (900° and 1150° F.), and preferably between about 538° and 595° C. (1000° and 1050° F). The riser top temperature is usually controlled by adjusting the catalyst to oil ratio in riser 4 or by varying feed preheat.

Cyclone 8 separates most of the catalyst from the cracked products and discharges this catalyst down via dipleg 12 to a stripping zone 30 located in a lower portion of vessel 2. Vapor and minor amounts of catalyst exit cyclone 8 via gas effluent conduit 20 and flow into connector 24, which allows for thermal expansion, to conduit 22 which leads to a second stage reactor cyclone 14. The second cyclone 14 recovers some additional catalyst which is discharged via dipleg 18 to the stripping zone 30.

The second stage cyclone overhead stream, cracked products and catalyst fines, passes via effluent conduit 16 and line 120 to product fractionators not shown in the figure. Stripping vapors enter the atmosphere of the vessel 2 and exit this vessel via outlet line 22 or by passing through the annular space 10 defined by outlet 20 and inlet 24.

The coked catalyst discharged from the cyclone diplegs collects as a bed of catalyst 31 in the stripping zone 30. Dipleg 12 is sealed by being extended into the catalyst bed 31. Dipleg 18 is not immersed in bed 31, but is sealed by a trickle valve 19.

Although only two cyclones 8 and 14 are shown, many cyclones, 4 to 8, are usually used in each cyclone separation stage. A preferred closed cyclone system is described in U.S. Pat. No. 4,502,947 to Haddad et al, which is incorporated by reference.

Stripper 30 has a first stage and a second stage of stripping. The first stage of stripping occurs in dense phase fluidized bed 31. The first stage of stripping is relatively "hot." Spent catalyst is mixed in bed 31 with hot catalyst from the regenerator. Regenerated catalyst is added via line 107, overflows weir 500, and flows into dense bed 31. Direct contact heat exchange heats spent catalyst. The regenerated catalyst, which has a temperature from 55° C. (100° F.) above the stripping zone 30° to 871° C. (1600° F.), heats spent catalyst in bed 31. Catalyst from regenerator 80 enters vessel 2 via transfer line 106, and slide valve 108 which controls catalyst flow. Adding hot, regenerated catalyst permits first stage stripping at from 25° C. (45° F.) above the riser reactor outlet temperature to 816° C. (1500° F.). Preferably, the first stage stripping zone operates at least 50° C. (00° F.) above the riser top temperature, but below 760° C. (1400° F.).

In addition to direct contact heat exchange of spent catalyst in the stripper bed 31 there can be indirect heat exchange of catalyst. This can be accomplished, as shown in the figure, by providing an annular catalyst transfer passage 409 around 10-90% of the diameter of the bed 31. This provides some additional heating of spent catalyst, without diluting spent catalyst with hot, regenerated catalyst. This can be beneficial, when higher temperature stripping in bed 31 is sought, with higher stripping gas to catalyst ratios being achieved, because not so much regenerated catalyst is present. Gradual, indirect heating of spent catalyst in bed 31 is also beneficial in minimizing the amount of time that the spent catalyst spends in a steam atmosphere at high temperature. The spent catalyst can thus reach a peak temperature at the bottom of bed 31, and then be subjected to a vigorous second stage of stripping, and simultaneously cooled in the second stage stripping zone 230 discussed in more detail hereafter.

Returning to bed 31, and the largely conventional stripping which occurs there, a stripping gas, preferably steam, flows counter-current to the catalyst. The stripping gas is preferably introduced into the lower portion of bed 31 by one or more conduits 134 to steam distributing means 136. The first catalyst stripping zone bed 31 preferably contains trays (baffles) 32. The trays may be disc- and doughnut-shaped and may be perforated or unperforated. Steam may be added to multiple levels of bed 31, such as via stripping steam distribution means 236 in a lower portion of the stripper. Stripped hydrocarbons may be withdrawn from multiple elevations of the catalyst bed 31 by means not shown, if desired.

The catalyst residence time in bed 31 in the stripping zone 30 preferably ranges from 1 to 7 minutes. The vapor residence time in the bed 31, the first stage stripping zone, preferably ranges from 0.5 to 30 seconds, and most preferably 0.5 to 5 seconds.

High temperature stripping removes coke, sulfur and hydrogen from the spent catalyst. Coke is removed because carbon in the unstripped hydrocarbons is burned as coke in the regenerator. The sulfur is removed as hydrogen sulfide and mercaptans. The hydrogen is removed as molecular hydrogen, hydrocarbons, and hydrogen sulfide. The removed materials also increase the recovery of valuable liquid products, because the stripper vapors can be sent to product recovery with the bulk of the cracked products from the riser reactor. High temperature stripping can reduce coke load to the regenerator by 30 to 50% or more and remove 50–80% of the hydrogen as molecular hydrogen, light hydrocarbons and other hydrogen-containing compounds, and remove 35 to 55% of the sulfur as hydrogen sulfide and mercaptans, as well as a portion of nitrogen as ammonia and cyanides.

After high temperature stripping in bed 31, the catalyst has a much reduced content of strippable hydrocarbons, but still contains some strippable hydrocarbons. The present invention provides for a second stage of catalyst stripping which also cools the catalyst.

The hot stripped catalyst from bed 31 passes via opening 406 into fluidized bed 231. To provide additional heating of stripped catalyst from the first stage, it is preferred to add more hot, regenerated catalyst from passageway 409 by educting means not shown. This allows transfer of hot regenerated catalyst to either the inlet of the second stage stripping zone or to the stripped catalyst which is removed from the stripper bed 31 and charged to the regeneration means.

A stab in heat exchanger or tube bundle 48 is inserted into the lower portion of bed 231. For effective heat exchange, and for effective stripping, the bed 231 should be fluidized with steam or other stripping vapor, added via line 34 and distributing means 36. The gas added via line 34 performs three functions: control of heat transfer, stripping gas, and recycle of stripped catalyst back to the first stage stripping zone.

It may seem counterproductive to add hot regenerated catalyst to the inlet of the second stage stripping zone and almost immediately pass the hot catalyst, and stripped catalyst from the first stage, over a heat exchanger. High temperatures favor rapid and effective stripping, but also steams the catalyst. High temperatures are needed, but preferably for the shortest possible time. Adding hot catalyst to stripped catalyst from the first stage, then mixing and cooling it over a heat exchanger can significantly reduce the high temperature steaming of the catalyst. There is another benefit, in that the hot regenerated catalyst added to the second stage stripper is so hot that it will not absorb significant amounts of hydrocarbons stripped in the second stage stripper. In a very short residence time situation, such as exists in the second stage stripper, the added hot catalyst will supply heat, but will not readsorb stripped hydrocarbons, or adsorb stripping gas as much as the spent catalyst, which is cooler.

The process and apparatus of the present invention allows, for the first time, for "refluxing" of the catalyst stripper.

Preferably, the refluxing is accompanied by heat removal across the heat exchange coil, but this is not essential. Heat removal can be eliminated entirely by shutting off the flow of cooling fluid to the heat exchanger 48. Heat removal is preferred to keep temperatures lower in the steam rich environment of dense bed 31, and fluidized but not necessarily dense bed 231. It should be recognized that reducing the temperature of the catalyst in bed 231 does not improve stripping efficiency over that achieved at a higher temperature in bed 31, but it will improve catalyst life. The additional stage of stripping in stripping zone 230 will remove an additional increment of hydrogen, sulfur, etc. from the catalyst, by virtue of more contact time, contact with fresh stripping gas, and better contacting of spent catalyst with stripping gas (flow of catalyst through bed 31 frequently will not be uniform, and some of the catalyst may not be well stripped despite the overall severe stripping conditions in bed 31). Overall stripping efficiency will also be improved because a refluxed stripper, like a refluxed distillation column, does a much better job than once through stripping. Any unstripped or poorly stripped catalyst not well stripped in its first pass through the primary stripping zone will be stripped efficiently in the second stage stripping zone, and then have one more pass through the primary stripping zone.

In another embodiment, the present invention can also approach three stages of stripping in the apparatus shown in the Figure. This can be done using a conventional annular stripper, and diverting most of the spent catalyst from the cyclone to one side, e.g., the North side, of the stripper. Hot regenerated catalyst is also added to the North side, to achieve some heating of spent catalyst. Catalyst discharged from the primary stripper can be withdrawn from the North side of the base of the stripper. Additional hot, regenerated catalyst can be added via duct tube 536, and the catalyst subjected to a second stage of stripping in vessel 230. Spent catalyst and stripped hydrocarbons can be discharged over the South side of the primary stripper. The South side of the primary stripper can thus function as a third stage stripper. Catalyst withdrawn from the base of the South side of the primary stripper can be mixed with additional hot, regenerated catalyst from passageway 409, and the triply stripped, heated catalyst can be withdrawn via line 42 and regenerated. This can be achieved to a great extent in conventional annular strippers, because there is not too much mixing of catalyst from one side of the stripper to the other.

If desired, a vertical baffle can be placed in the stripper to improve the segregation of the North side of the primary stripper from the South side of the primary stripper, which in this instance would actually be a third stage stripper. No great harm is done if a certain amount of mixing occurs, and some of the catalyst is withdrawn from the base of the catalyst stripper after only one stage of stripping and regenerated, or if some of the catalyst makes 9 or 10 passes through the stripper. Such random events occur all the time in fluidized bed processes. What is important is that 100% of the catalyst will be subjected to at least one stage of stripping, and that most of the stripped catalyst from the primary stripping stage will be subjected to another vigorous stripping stage. It is beneficial if most the catalyst discharged from the second stage of stripping can be segregated and subjected to a third stage of stripping. Alternatively, catalyst discharged from the second stage of stripping may be made to bypass further stripping, and discharged from the second stage stripper outlet to the inlet to line 42, which leads to the catalyst regeneration zone. This can be done by allowing the second stage stripper to discharge into a stripper cyclone, and having the dipleg of the cyclone extend to the base of stripper 30, preferably near line 42.

The present invention, in providing a second stage of stripping, while simultaneously removing heat from catalyst in bed 231, makes double use of the stripping medium added via line 34. Stripping gas not only strips, it improves the heat transfer coefficient achieved across tube bundle 48, permitting maximum transfer of heat from hot catalyst to fluid in line 40 (typically boiler feed water or low grade stream) to produce heated heat transfer fluid in line 56 (typically high grade steam).

Although steam may be used as the stripping medium in line 36, other stripping fluids such as flue gas may also be used.

Stripper vapors from the second stage of stripping may also be discharged by means not shown to the second stage cyclone 14, so that stripped hydrocarbons may be recovered as product and entrained catalyst recycled to the stripping zone.

The temperature profile in the second stage stripper will be favorable for moderately effective stripping in the upper portions thereof, and for maximum temperature reduction in the lower portion. The temperature of catalyst entering the second stage of stripping will be about equal to that of catalyst exiting the first stripping zone, or bed 31. There will be minimal reduction in temperature in bed 231 due to the temperature of the stripping gas; there is so much more catalyst than stripping gas that only modest reductions in temperature will occur when cold stripping gas is used. The bulk of the temperature drop occurs across and around the stab in heat exchanger bundle 48.

Preferably the catalyst exiting the second stage stripper is at least 50° F. cooler than the catalyst in the hot stripper, or bed 31. More preferably, the catalyst leaving the stripper via line 42 is 75°–200° F. cooler than the catalyst in bed 31.

Although not shown in the Figure, an external catalyst stripper/cooler, with inlets for hot catalyst and fluidization gas, and outlets for cooled catalyst and stripper vapor, may also be used. In some units, there may be mechanical constraints preventing use of a stab in tube bundle as shown in the drawing. The essential features, use of fluidizing gas both to improve heat transfer across the heat exchange means and to obtain a second stage of stripping, and recycle of catalyst from the second stage of stripping back to the first stripping stage, remain the same when an external stripper/cooler is used.

The process of the present invention can function much like a thermosiphon reboiler, using stripping gas, for stripping, heat exchange, and to move spent catalyst from a low elevation to a higher elevation. In such a unit, both hot catalyst and stripping gas would enter the bottom of the unit, would flow co-currently up across or alongside of a heat exchange bundle, and discharge together into the stripper or into the catalyst regenerator catalyst inlet.

Stripped catalyst from the bottom of bed 31, along with hot regenerated catalyst added via passageway 409, are pooled and withdrawn via stripped catalyst effluent line 42. It is an advantage of the present invention that the stripped catalyst, and hot regenerated catalyst, will have a relatively long contact time prior to entering the regenerator 80. Hot catalyst can re rapidly regenerated in the regenerator associated with the FCC unit. A catalyst cooler, not shown, and usually not needed, may be provided to cool the catalyst, if necessary to maintain the regenerator 80 at a temperature between 55° C. (100° F.) above the temperature of the stripping zone 30 and 871° C. (1600° F). An external catalyst cooler, cooling the stripped catalyst before it enters the regenerator vessel, will not remove any strippable hydrocarbons.

When an external catalyst cooler is used it preferably is an indirect heat-exchanger using a heat-exchange medium such as liquid water (boiler feed water).

The stripped catalyst, preferably at the same bulk temperature as the temperature of the mixture of stripped and regenerated catalyst leaving the stripping zone, passes through the conduit 42 into regenerator riser 60. Air and cooled catalyst combine and pass up through an air catalyst disperser 74 into coke combustor 62 in regenerator 80. In bed 62, combustible materials, such as coke on the cooled catalyst, are burned by contact with air or oxygen containing gas. At least a portion of the air passes via line 66 and line 68 to riser-mixer 60.

Preferably the amount of air or oxygen containing gas added via line 66, to the base of the riser mixer 60, is restricted to 50–95% of total air addition to the regenerator 80. Restricting the air addition slows down to some extent the rate of carbon burning in the riser mixer, and this will minimize localized high temperatures experienced by the catalyst in the regenerator. Limiting the air limits the burning and temperature rise experienced in the riser mixer, and limits the amount of catalyst deactivation that occurs there. It also ensures that most of the water of combustion, and resulting steam, will be formed at the lowest possible temperature.

Additional air, preferably 5–50% of total air, is preferably added to the coke combustor via line 160 and air ring 167. In this way the regenerator 80 can be supplied with as much air as desired, and can achieve complete afterburning of CO to CO2, even while burning much of the hydrocarbons at relatively mild, even reducing conditions, in riser mixer 60.

To achieve higher temperatures in the coke combustor, and to promote CO afterburning, the temperature of fast fluidized bed 76 in the coke combustor 62 may be increased by recycling some hot regenerated catalyst thereto via line 101 and control valve 103. Preferably most catalyst recycle will occur via passageway 409, so that most of the recycled regenerated catalyst mixes with the spent catalyst well upstream of the coke combustor.

In coke combustor 62 the combustion air, regardless of whether added via line 66 or 166, fluidizes the catalyst in bed 76, and subsequently transports the catalyst continuously as a dilute phase through the regenerator riser 83. The dilute phase passes upwardly through the riser 83, through a radial arm 84 attached to the riser 83. Catalyst passes down to form a second relatively dense bed of catalyst 82 located in regenerator 80.

While most of the catalyst passes down through the radial arms 84, the gases and some catalyst pass into the atmosphere or dilute phase region 183 of the regenerator Vessel 80. The gas passes through inlet conduit 89 into the first regenerator cyclone 86. Some catalyst is recovered via a first dipleg 90, while remaining catalyst and gas passes via overhead conduit 88 into a second regenerator cyclone 92. The second cyclone 92 recovers more catalyst, and passes it via a second dipleg 96 having a trickle valve 97 to the second dense bed. Flue gas exits via conduit 94 into plenum chamber 98. A flue gas stream 110 exits the plenum via conduit 100.

The hot, regenerated catalyst forms the bed 82, which is substantially hotter than the stripping zone 30. Bed 82 is at least 55° C. (100° F.) hotter than stripping zone 31, and preferably at least 83° C. (150° F.) hotter. The regenerator temperature is, at most, 871° C. (1600° F.) to prevent deactivating the catalyst.

Optionally, air may also be added via line 70, and control valve 72, to an air header 78 located in dense bed 82.

Adding combustion air to second dense bed 82 allows some of the coke combustion to be shifted to the relatively dry atmosphere of dense bed 82, and minimize hydrothermal degradation of catalyst. There is an additional benefit, in that the staged addition of air limits the temperature rise experienced by the catalyst at each stage, and limits somewhat the amount of time that the catalyst is at high temperature.

Preferably, the amount of air added at each stage (riser mixer 60, coke combustor 62, transport riser 83, and second dense bed 82) is monitored and controlled to have as much hydrogen combustion as soon as possible and at the lowest possible temperature while carbon combustion occurs as late as possible, and highest temperatures are reserved for the last stage of the process. In this way, most of the water of combustion, and most of the extremely high transient temperatures due to burning of poorly stripped hydrocarbon occur in riser mixer 60 where the catalyst is coolest. The steam formed will cause hydrothermal degradation of the zeolite, but the temperature will be so low that activity loss will be minimized. Reserving some of the coke burning for the second dense bed will limit the highest temperatures to the driest part of the regenerator. The water of combustion formed in the riser mixer, or in the coke combustor, will not contact catalyst in the second dense bed 82, because of the catalyst flue gas separation which occurs exiting the dilute phase transport riser 83.

There are several constraints on the process. If complete CO combustion is to be achieved, temperatures in the dilute phase transport riser must be high enough, or the concentration of CO combustion promoter must be great enough, to have essentially complete combustion of CO in the transport riser. Limiting combustion air to the coke combustor or to the dilute phase transport riser (to shift some coke combustion to the second dense bed 82) will make it more difficult to get complete CO combustion in the transport riser. Higher levels of CO combustion promoter will promote the dilute phase burning of CO in the transport riser while having much less effect on carbon burning rates in the coke combustor or transport riser.

If the unit operates in only partial combustion mode, to allow only partial CO combustion, and shift heat generation, to a CO boiler downstream of the regenerator, then much greater latitude re air addition at different points in the regenerator is possible. Partial CO combustion will also greatly reduce emissions of NOx associated with the regenerator. Partial CO combustion is a good way to accommodate unusually bad feeds, with CCR levels exceeding 5 or 10 wt %. Downstream combustion, in a CO boiler, also allows the coke burning capacity of the regenerator to increase and permits much more coke to be burned using an existing air blower of limited capacity Regardless of the relative amounts of combustion that occur in the various zones of the regenerator, and regardless of whether complete or only partial CO combustion is achieved, the catalyst in the second dense bed 82 will be the hottest catalyst, and will be preferred for use as a source of hot, regenerated catalyst for heating spent, coked catalyst in the catalyst stripper of the invention. Preferably, hot regenerated catalyst is withdrawn from dense bed 82 and passed via line 106 and control valve 108 into dense bed of catalyst 31 in stripper 30.

Control of the total amount of hot regenerated catalyst recycled from the regenerator can be achieved by opening or closing valve 108, and to a lesser extent by altering the depth of bed 82. Control of the split between flow of recycled, regenerated catalyst into the first stage stripping zone 31 or via passageway 409 into the outlet of the first stage stripping zone can be conventionally controlled. Extra fluidizing gas can be added by means not shown to promote the flow of more catalyst over weir 500 (as by a steam sparger not shown on the upstream size of weir 500) or by adjusting the amount of fluidizing gas added, by means not shown, to the base of bed 409. Increasing amounts of fluidizing gas will decrease the viscosity of the catalyst in passageway 409 and increase the flow of catalyst via passageway 409. Operating with a high level of catalyst in the first stage stripper will reduce flow of hot regenerated catalyst over weir 500 and will reduce the direct contact heating of spent catalyst in bed 31.

Now that the invention has been reviewed in connection with the embodiment shown in the Figure, a more detailed discussion of the different parts or the process and apparatus of the present invention follows. Many elements of the present invention can be conventional, such as the cracking catalyst, so only a limited discussion of such elements is necessary.

FCC FEED

Any conventional FCC feed can be used. The process of the present invention is especially useful for processing difficult charge stocks, those with high levels of CCR material, exceeding 2, 3, 5 and even 10 wt %CCR. The process, especially when operating in a partial CO combustion mode, tolerates feeds which are relatively high in nitrogen content, and which otherwise might result in unacceptable NOx emissions in conventional FCC units.

The feeds may range from the typical, such as petroleum distillates or residual stocks, either virgin or partially refined, to the atypical, such as coal oils and shale oils. The feed frequently will contain recycled hydrocarbons, such as light and heavy cycle oils which have already been subjected to cracking.

Preferred feeds are gas oils, vacuum gas oils, atmospheric resids, and vacuum resids. The present invention is most useful when feeds contain more than 5, or more than 10 wt % material which is not normally distillable in refineries. Usually all of the feed will boil above 650° F., and 5 wt %, 10 wt % or more will boil above 1000° F.

FCC CATALYST

Any commercially available FCC catalyst may be used. The catalyst can be 100% amorphous, but preferably includes some zeolite in a porous refractory matrix such as silica-alumina, clay, or the like. The zeolite is usually 5–40 wt.% of the catalyst, with the rest being matrix. Conventional zeolites include X and Y zeolites, with ultra stable, or relatively high silica Y zeolites being preferred. Dealuminized Y (DEAL Y) and ultrahydrophobic Y (UHP Y) zeolites may be used. The zeolites may be stabilized with Rare Earths, e.g., 0.1 to 10 Wt % RE.

Relatively high silica zeolite containing catalysts are preferred for use in the present invention. They withstand the high temperatures usually associated with complete combustion of CO to CO2 within the FCC regenerator.

The catalyst inventory may also contain one or more additives, either present as separate additive particles or mixed in with each particle of the cracking catalyst. Additives can be added to enhance octane (shape selective zeolites, i.e., those having a Constraint Index of 1-12, and typified by ZSM-5, and other materials having a similar crystal structure), adsorb SOX (alumina), remove Ni and V (Mg and Ca oxides).

The FCC catalyst composition, per se, forms no part of the present invention.

FCC REACTOR CONDITIONS

Conventional FCC reactor conditions may be used. The reactor may be either a riser cracking unit or dense bed unit or both. Riser cracking is highly preferred. Typical riser cracking reaction conditions include catalyst/oil ratios of 0.5:1 to 15:1 and preferably 3:1 to 8:1, and a catalyst contact time of 0.5-50 seconds, and preferably 1-20 seconds.

The FCC reactor conditions, per se, are conventional and form no part of the present invention.

CATALYST STRIPPER/COOLER/HEATER

A refluxed catalyst stripper is the essence of the present invention. Preferably the stripper also heats spent catalyst by direct contact heat exchange with hot regenerated catalyst, strip it in a two stage stripper, and cool it during the second stage of stripping. The stripped, cooled catalyst is then reheated by direct contact heat exchange with more hot regenerated catalyst, and charged to the catalyst regenerator.

Heating of the coked, or spent catalyst is the first step. Direct contact heat exchange of spent catalyst with a source of hot regenerated catalyst is used to efficiently heat spent catalyst. This may be supplemented by indirect heat exchange.

Spent catalyst from the reactor, usually at 900° to 1150° F., preferably at 950° to 1100° F., is charged to the stripping zone of the present invention and contacts hot regenerated catalyst at a temperature of 1200°-1700° F., preferably at 1300°-1600° F. The spent and regenerated catalyst can simply be added to a conventional stripping zone with no special mixing steps taken. The slight fluidizing action of the stripping gas, and the normal amount of stirring of catalyst passing through a conventional stripper will provide enough mixing effect to heat the spent catalyst. Some mixing of spent and regenerated catalyst is preferred, both to promote rapid heating of the spent catalyst and to ensure even distribution of spent catalyst through the stripping zone. Mixing of spent and regenerated catalyst may be promoted by providing some additional fluidizing steam or other stripping gas at or just below the point where the two catalyst streams mix. Splitters, baffles or mechanical agitators may also be used if desired.

The amount of hot regenerated catalyst added to and mixed with spent catalyst can vary greatly depending on the stripping temperature desired and on the amount of heat to be removed via the stripper heat removal means discussed in more detail below. In general, the weight ratio of regenerated to spent catalyst will be from 1:20 to 5:1, preferably 1:10 to 4:1 and most preferably 1:5 to 1:1. High ratios of regenerated to spent catalyst will be used when extremely high stripping efficiency is needed or when large amounts of heat removal are sought in the stripper catalyst cooler. Small ratios will be used when the desired stripping temperature; or stripping efficiency can be achieved with smaller amounts of regenerated catalyst, or when heat removal from the stripper cooler must be limited.

The amount of heat added via indirect heat exchange will usually be 10 to 100% of the heat added via direct heat exchange.

High temperature stripping conditions will usually include temperatures at least 50° F. higher than the reactor riser outlet but should be less than about 1500° F. Preferably, temperatures range from 75° F. above the reactor outlet and about 1300° F. Best results will usually be achieved with hot stripping temperatures of 1050°-1200° F.

After the first stage of stripping in bed 31, the mixture of regenerated and spent catalyst is given a second stage of stripping, and simultaneously cooled by indirect heat exchange. The second stage of stripping is preferably conducted immediately after the first, or high temperature stripping stage. The second stage may be in a vessel contiguous to the primary stripping stage, as shown in the Figure, or the second stage may be in a separate vessel which is somewhat remote from, and higher or lower than the primary stripping stage.

The second stage of stripping is characterized by a reduced temperature, not necessarily at the inlet but certainly at the outlet. The second stage may use the same stripping gas as the first stage (usually steam will be used in the first or high temperature stripping stage). The stripper vapors from the second stage may be mixed with cracked product vapor, with stripper vapor generated in the first stage, or treated separately from any other vapor stream around the FCC unit. The process of the present invention is amenable to use of flue gas or CO or other specialized stripping gas designed to bring about some chemical reaction in addition to stripping.

Steam is the preferred stripping medium in both stages. Preferably the second stage stripper vapors simply mix with the first stage stripper vapor. A separate stripper vapor outlet is provided for the second stage may be provided, so that the stripper/cooler vapor can be removed rather than forced to pass through the first stage stripper. Since the catalyst discharged from the second stage is preferably recycled to the first stage, it is preferred to allow the stripping vapors from both stages to share a common vapor space above the first stripping stage, as shown in the Figure.

Cooling of the stripped catalyst in the second stage stripper is preferred. A dimpled jacked heat exchanger, stab in tube bundle, circular tubes, etc. can be used to provide a means to remove heat from the catalyst in the second stage stripper. A stab in tube bundle, as shown in the drawing, is preferred because such items are readily available from equipment vendors and are easy to install in existing or new FCC strippers. The tube bundle can freely expand and contract with changes in temperature, so the device need only be sealed at the base thereof, where it is stabbed into the stripper.

As an alternate, or adjunct, to a stab in heat exchanger a separate, second stage stripping vessel may be provided. Hot catalyst from the first stage stripper can be discharged into a second stage stripper vessel containing a heat exchanger means, an inlet for fluidizing/stripping gas, an outlet for cooled, well stripped catalyst, and an outlet for second stage stripping vapor.

When there is not enough room in an existing FCC to accommodate a contiguous stripper, as shown, a separate, second stage stripper vessel may be used. So long as the second stage stripper receives hot catalyst from the first stage stripper, and strips it and cools it simultaneously, and recycles at least a portion of the resulting stripped, and preferably cooled, catalyst back to the first stripping stage the end result will be the same. A separate vessel, functioning as a thermosiphon reboiler is a preferred embodiment of the second stage stripper operating in a remote vessel. In this embodiment the second stage stripper behaves like a reboiler in a distillation column. A fluid is added to a pot, "boiled" with stripping vapor, and the boiling fluid recycled back to the inlet of the first stage stripper, where cooled, stripped catalyst can separate from stripper vapor. In this embodiment, extremely large mass flows of hot catalyst across a heat exchange surface can be achieved at the price of greater consumption of energy, in blowing the stripping fluid into the base of the thermosiphon to carry tons and tons of catalyst to a higher elevation for recycle into the inlet of the primary stripper.

Addition of a stripping gas is essential for good stripping and to provide fluidization and agitation needed for efficient heat transfer. Dense phase, fluidized bed heat transfer coefficients are high and readily calculable.

Addition of hot, regenerated catalyst to the stripper at the base thereof, or at the outlet to the stripper, is needed to attain the high temperatures desired for rapid coke burn in the regenerator, and also to provide sufficient residence time for heating of stripped catalyst with hot, regenerated catalyst upstream of the regenerator. With temperature equilibrium in a long transfer line from the stripper to the regenerator will also come a measure of composition equalization as well, i.e., there will be some migration of residual unstripped hydrocarbons from "stripped" catalyst to regenerated catalyst. This migration of hydrocarbon in the transfer line does no harm, everything in the transfer line to the regenerator will be burned in the regenerator anyway. This migration will reduce somewhat the concentration of strippable hydrocarbons from the "stripped" catalyst, and this in turn will reduce somewhat the localized high temperatures experienced by the catalyst when it first enters the regenerator. The bulk temperature of the catalyst mixture of the present invention in the regenerator after 1 second of residence time will be essentially the same as the bulk temperature of a mixture of hot regenerated and stripped catalyst added separately to the coke combustor, the difference is that the individual particles of "stripped" catalyst of the present invention will not be as hot.

Preferable the amount of hot regenerated catalyst added to the base of the stripper is within an order of magnitude of the amount of catalyst added to the inlet of the stripper, for direct heat exchange, i.e., 1/10 to 10/1. More preferably, the amount of regenerated catalyst added to the stripper base is about 50% to 200% of the amount of catalyst added to the stripper inlet.

CATALYST REGENERATION

The invention can benefit FCC units using any type of regenerator, ranging from single dense bed regenerators to the more modern, high efficiency design shown in the Figure.

Single, dense phase fluidized bed regenerators can be used, but are not preferred. These generally operate with spent catalyst and combustion air added to a dense phase fluidized bed in a large vessel. There is a relatively sharp demarcation between the dense phase and a dilute phase above it. Hot regenerated catalyst is withdrawn from the dense bed for reuse in the catalytic cracking process, and for use in the hot stripper of the present invention.

High efficiency regenerators, preferably as shown and described in the Figure, are the preferred catalyst regenerators for use in the practice of the present invention.

The process of the present invention permits significant reductions to be made in the amount of hot regenerated catalyst that is recycled to the coke combustor of a high efficiency regenerator. Preferably, a majority of the catalyst recycle that occurs does so via addition of hot regenerated catalyst to the inlet or outlet of the catalyst stripper. Ideally, all of the hot regenerated catalyst added to the coke combustor is added via recycle to the catalyst stripper inlet or outlet.

FCC REGENERATOR CONDITIONS

The temperatures, pressures, oxygen flow rates, etc., are within the broad ranges of those heretofore found suitable for FCC regenerators, especially those operating with substantially complete combustion of CO to $CO_2$ within the regeneration zone. Suitable and preferred operating conditions are:

|  | Broad | Preferred |
|---|---|---|
| Temperature, °F. | 1100–1700 | 1150–1400 |
| Catalyst Residence Time, Seconds | 60–3600 | 120–600 |
| Pressure, atmospheres | 1–10 | 2–5 |
| % Stoichiometric O2 | 100–120 | 100–105 |

CO COMBUSTION PROMOTER

Use of a CO combustion promoter in the regenerator or combustion zone is not essential for the practice of the present invention, however, it is preferred. These materials are well-known.

U.S. Pat. No. 4,072,600 and U.S. Pat. No. 4,235,754, which are incorporated by reference, disclose operation of an FCC regenerator with minute quantities of a CO combustion promoter. From 0.01 to 100 ppm Pt metal or enough other metal to give the same CO oxidation, may be used with good results. Very good results are obtained with as little as 0.1 to 10 wt. ppm platinum present on the catalyst in the unit. In swirl type regenerators, operation with 1 to 7 ppm Pt commonly occurs. Pt can be replaced by other metals, but usually more metal is then required. An amount of promoter which would give a CO oxidation activity equal to 0.3 to 3 wt. ppm of platinum is preferred.

Conventionally, refiners add CO combustion promoter to promote total or partial combustion of CO to $CO_2$ within the FCC regenerator. More CO combustion promoter can be added without undue bad effect—the primary one being the waste of adding more CO combustion promoter than is needed to burn all the CO.

The present invention can operate with extremely small levels of CO combustion promoter while still achieving relatively complete CO combustion because the heavy, resid feed will usually deposit large amounts of coke on the catalyst, and give extremely high regenerator temperatures. The high efficiency regenerator design is especially good at achieving complete CO combustion in the dilute phase transport riser, even without any CO combustion promoter present, provided sufficient hot, regenerated catalyst is recycled from the second dense bed to the coke combustor. Catalyst recycle to the coke combustor promotes the high temperatures needed for rapid coke combustion in the coke combustor and for dilute phase CO combustion in the dilute phase transport riser.

Usually it will be preferred to operate with much higher levels of CO combustion promoter when either partial CO combustion is sought, or when more than 5–10% of the coke combustion is shifted to the second dense bed. More CO combustion promoter is needed because catalysis, rather than high temperature, is being relied on for smooth operation.

This concept advances the development of a heavy oil (residual oil) catalytic cracker and high temperature cracking unit for conventional gas oils. The permits control of catalyst carbon-contamination level to some extent and control of temperature in the stripper and regenerator.

The hot stripper temperature, and the amount or stripped catalyst recycle or reflux, permits some control on the amount of carbon removed from the catalyst in the hot stripper. Accordingly, the hot stripper controls the amount of carbon (and hydrogen, sulfur) remaining on the catalyst to the regenerator. This residual carbon level controls the temperature rise between the reactor stripper and the regenerator. The hot stripper, and/or adjustment of catalyst recycle permits a large amount of control of the hydrogen content of the spent catalyst sent to the regenerator. Thus, the stripper of the invention can be used to controls the temperature and amount of hydrothermal deactivation of catalyst in the regenerator. This may be practiced in a multi-stage, multi-temperature stripper or a single stage stripper.

Employing a hot stripper, to remove more carbon and hydrogen from the catalyst, rather than burning the carbon and hydrogen in a regenerator, reduces carbon emissions, and the reduced burning load facilitates burning all the carbon charged to the regenerator to $CO_2$, if desired.

The stripped catalyst is cooled (as a function of its carbon level) to a desired regenerator inlet temperature to control the degree of regeneration desired, in combination with the other variables of $CO/CO_2$ ratio desired, the amount of carbon burn-off desired, the catalyst recirculation rate from the regenerator to the hot stripper, and the desulfurization, denitrification and/or decarbonization desired in the hot stripper. Increasing the $CO/CO_2$ ratio decreases the heat generated in the regenerator, and decreases the regenerator temperature. Burning the coke to CO removes the coke, as would burning coke to $CO_2$, but burning to CO produces less heat than burning to $CO_2$.

Catalyst recirculation from the regenerator to the hot stripper affects regenerator temperature, because increasing catalyst recycle from the regenerator to the hot stripper increases the hot stripper temperature. Hotter stripping removes more coke, to decrease coke load on, and temperature of, the regenerator.

The catalyst cooler controls regenerator temperature, thereby allowing the hot stripper to be run at temperatures above the riser top temperature, while allowing the regenerator to be run independently of the stripper.

The present invention strips catalyst at a temperature higher than the riser exit temperature to separate hydrogen, as molecular hydrogen or hydrocarbons from the coke which adheres to catalyst. This minimizes catalyst steaming, or hydrothermal degradation, which typically occurs when hydrogen reacts with oxygen in the FCC regenerator to form water. The high temperature stripper (hot stripper) also removes much sulfur from coked catalyst as hydrogen sulfide and mercaptans, which are easy to scrub. In contrast, burning sulfurous coke in a regenerator produces SOx in the regenerator flue gas. The high temperature stripping recovers additional valuable hydrocarbon products to prevent burning these hydrocarbons in the regenerator. High temperature stripping also quickly separates hydrocarbons from catalyst. If catalyst contacts hydrocarbons for too long a time at a temperature near or above 538° C.

(1000° F.), then diolefins are produced which are undesirable for downstream processing, such as alkylation. However, the present invention allows a precisely controlled, short contact time at 538° C. (1000° F.) or greater to produce premium, unleaded gasoline with high selectivity.

The heat-exchanger (catalyst cooler) controls regenerator temperature. This allows the hot stripper to run at a desired temperature to control sulfur and hydrogen without interfering with a desired regenerator temperature. It is best to run the regenerator at least 55° C. (100° F.) hotter than the hot stripper. Usually the regenerator should be kept below 871° C. (1600° F.) to prevent thermal deactivation of the catalyst, although somewhat higher temperatures can be tolerated with staged catalyst regeneration, with removal of flue gas intermediate the stages.

The ratio of recycled catalyst to spent catalyst entering the stripper may range from 1:9 to 9:1, andpreferably from 1:5 to 2:1, more preferably from 1:4 to 1:1.

I claim:

1. A fluidized catalytic cracking process wherein a heavy hydrocarbon feed comprising hydrocarbons having a boiling point above about 650° F. is catalytically cracked to lighter products comprising the steps of:
   a. catalytically cracking said feed in a catalytic cracking reactor operating at catalytic cracking conditions including a cracking temperature of 425° to 600° C. by contacting feed with a source of regenerated of 425° to 600° C. by contacting feed with a source of regenerated catalyst to produce a cracking reactor effluent mixture comprising cracked products and spent catalyst containing coke and strippable hydrocarbons;
   b. separating said effluent mixture into a cracked product rich vapor phase and a solids rich phase comprising spent catalyst;
   c. stripping said solids rich phase in a catalyst stripping zone with stripping gas, in a counter-current catalyst stripper having:
   an upper portion with an inlet for spent catalyst and a vapor outlet for stripped hydrocarbons and stripping gas; and
   a lower portion having an inlet for stripping gas, and an outlet for discharge of stripped catalyst,
   to remove strippable compounds and produce stripped catalyst which is removed from said lower portion of said catalyst stripper;
   d. recycling stripped catalyst removed from said lower portion of said catalyst stripper to said upper portion of said catalyst stripping zone in an amount so that the weight ratio of recycled stripped catalyst to spent catalyst entering the stripper ranges from 1:9 to 9:1;
   e. regenerating at least a portion of said stripped catalyst in a catalyst regeneration means at catalyst regeneration conditions including a regenerator temperature of 593° to 871° C. to produce regenerated catalyst which is recycled to said catalytic cracking reactor.

2. The process of claim 1 wherein the ratio of recycled catalyst to spent catalyst entering the stripper ranges from 1:5 to 2:1.

3. The process of claim 1 wherein the ratio of recycled catalyst to spent catalyst entering the stripper ranges from 1:4 to 1:1.

4. The process of claim 1 wherein catalyst recycled to the stripper is cooled in a catalyst cooling means.

5. The process of claim 1 wherein catalyst recycled to the stripper is cooled in a catalyst cooling means.

6. The process of claim 1 wherein spent catalyst in said cracking reactor effluent mixture is heated and cooled in a refluxed, multi-stage catalyst stripper by:
   i. heating said solids rich spent catalyst phase by mixing with a source of regenerated catalyst having a temperature of 593° to 871° C. and wherein the weight ratio of regenerated to spent catalyst is from 1:20 to 5:1 to produce a heated catalyst mixture comprising spent and regenerated catalyst;
   ii. stripping in a primary stripping stage said heated catalyst mixture with a stripping gas to remove strippable compounds from spent catalyst and produce at least partially stripped catalyst;
   iii. stripping and cooling in a secondary stripping stage said partially stripped catalyst by contacting said partially stripped catalyst with an indirect heat exchange means having an elevation and an inlet for secondary stripping gas, having an elevation beneath said indirect heat exchange means, wherein said secondary stripping gas fluidizes and strips said partially stripped catalyst and increases heat transfer across said indirect heat exchange means to produce a cooled, stripped catalyst mixture with a reduced content of strippable hydrocarbons and a secondary stripping vapor stream;
   iv. refluxing cooled, stripped catalyst mixture from said secondary stripping zone to said primary stripping stage.

7. The process of claim 6 wherein catalyst is withdrawn from said primary stripping stage and regenerated.

8. The process of claim 6 wherein at least a portion of cooled stripped catalyst withdrawn from said secondary stripping stage is regenerated.

9. A fluidized catalytic cracking process wherein a heavy hydrocarbon feed comprising hydrocarbons having a boiling point above about 650° F. is catalytically cracked to lighter products comprising the steps of:
   a. catalytically cracking said feed in a catalytic cracking reactor operating at catalytic cracking conditions including a cracking temperature of 425° to 600° C. by contacting said feed with a source of regenerated catalyst to produce a cracking reactor effluent mixture comprising cracked products and spent cracking catalyst containing coke and strippable hydrocarbons;
   b. separating said cracking reactor effluent mixture into a cracked product rich vapor phase and a solids rich phase comprising said spent catalyst and strippable hydrocarbons;
   c. heating said solids rich phase by mixing it with a source of regenerated catalyst having a temperature of 593° to 871° C. to produce a heated catalyst mixture comprising spent and regenerated catalyst;
   d. stripping said heated catalyst mixture and a stream of recycled, stripped catalyst with a stripping gas to remove strippable compounds from spent catalyst, in a primary counter-current catalyst stripper having:
   an upper portion with an inlet for said heated catalyst mixture and a vapor outlet for stripped hydrocarbons and stripping gas; and
   a lower portion having an inlet for stripping gas, and an outlet for discharge of stripped catalyst, to produce stripped catalyst which is discharged from said lower portion of said primary catalyst stripper;

e. passing from 10 to 90% of catalyst discharged down from said primary stripping stage to a catalyst regeneration means;

f. passing the remainder of catalyst discharged down from said primary stripping stage to a secondary stripping stage;

g. stripping and cooling said remaining catalyst in said secondary stripping stage by fluidizing with a stripping gas and removing heat by indirect heat exchange with a heat exchange means having a heat transfer coefficient and wherein the heat transfer coefficient for indirect heat exchange is higher than a heat transfer coefficient across said indirect heat exchange means obtainable without the presence of added stripping gas in said secondary stripping stage, to produce cooled, stripped catalyst with a reduced content of strippable hydrocarbons and a secondary stripping vapor stream;

h. recycling said cooled, stripped catalyst mixture from said secondary stripping zone to said inlet in said upper portion of said primary stripping zone;

i. regenerating said cooled, stripped catalyst mixture by contact with oxygen or an oxygen containing gas in said regeneration means to produce regenerated catalyst having a temperature of 593° to 871° C. as a result of combustion of coke on said spent catalyst;

j. recycling to the cracking reactor regenerated catalyst to crack more hydrocarbon feed; and k. recycling to the primary stripping stage regenerated catalyst to heat spent catalyst and wherein the weight ratio of regenerated to spent catalyst is from 1:20 to 5:1.

10. The process of claim 9 wherein the stripping gas in the first stage of stripping is steam, and wherein the strippable hydrocarbons removed in the first stage of stripping are mixed with cracked products.

11. The process of claim 9 wherein the stripping gas in the second stage of stripping is steam, and wherein the strippable hydrocarbons removed in the second stage of stripping are mixed with the strippable hydrocarbons removed in the first stage of stripping.

12. The process of claim 9 wherein the stripping gas in the second stage of stripping is selected from the group of H2, CO, CO2, and flue gas, and wherein the strippable hydrocarbons and flue gas removed in the second stage of stripping are removed from the catalytic cracking process separately from the cracked products.

13. The process of claim 9 wherein in the first stripping stage the ratio of regenerated to spent catalyst is 0.05:1 to 1:1 and the temperature of the mixture of regenerated and spent catalyst ranges from 50° F. above the cracking reactor effluent temperature to 1500° F., and the amount of stripping gas added to the first stripping zone is equal to 0.5 to 10 wt. % of the spent catalyst added to said first stage stripping zone.

14. The process of claim 9 wherein in the second stripping zone the temperature of the mixture of regenerated and spent catalyst is reduced from about 50° to about 200° F. by indirect heat exchange, and the amount of stripping gas added to the second stage stripping zone is equal to 0.5 to 10 wt. % of the spent catalyst added to said second stage stripping zone.

15. The process of claim 9 wherein hot, regenerated catalyst is added to the second stripping zone in an amount to increase the temperature of the spent catalyst mixture charged to the second stage stripping zone by at least about 50° to about 200° F., and the temperature of the mixture of regenerated and spent catalyst is then reduced about 50 to about 200 F by indirect heat exchange.

16. The process of claim 9 wherein the primary stripping stage comprises a dense phase fluidized bed of catalyst beneath a vapor phase in a primary stripping vessel, said second stage stripping zone comprises a separate vessel containing said heat exchange means and having an inlet in a base portion thereof for the catalyst mixture from the first stripping stage, an inlet in a lower portion thereof for second stage stripping gas and an upper outlet for discharge of a fluidized mixture of stripping gas and cooled catalyst from said second stripping stage and wherein said second stage outlet is operatively connected with and discharges into the vapor phase in said primary stripping zone.

17. The process of claim 9 wherein the catalytic cracking reactor comprises a riser reactor.

18. An apparatus for the fluidized catalytic cracking of a heavy hydrocarbon feed comprising hydrocarbons having a boiling point above about 650° F. to lighter products by contact said feed with catalytic cracking catalyst comprising:

a. a catalytic cracking reactor means having an inlet connective with said feed and with a source of regenerated catalyst and having an outlet for discharging a cracking reactor effluent mixture comprising cracked products and spent cracking catalyst containing coke and strippable hydrocarbons;

b. a separation means connective with said reactor outlet for separating said cracking reactor effluent mixture into a cracked product rich vapor phase and a solids rich phase comprising said spent catalyst and strippable hydrocarbons;

c. a primary stripping means adapted to contain a relatively dense phase fluidized bed of catalyst beneath a dilute vapor phase in a primary stripping vessel comprising in an upper portion thereof an inlet for a source of regenerated cracking catalyst, an inlet for spent catalyst, and a vapor outlet for stripped hydrocarbons and stripping gas and in a lower portion thereof an inlet for a primary stripping gas and an outlet for discharge of stripped solids;

d. a secondary stripping means comprising a vessel adapted to contain a fluidized bed of catalyst and having in a lower portion thereof an inlet for stripped solids connective with said solids outlet of said primary stripping means, and an inlet for a secondary stripping gas, an indirect heat exchange means within said secondary stripping vessel for removal of heat, and at least one outlet in an upper portion of said secondary stripping means for discharge of stripped catalyst and stripped hydrocarbons and secondary stripping gas; and having means for refluxing stripped catalyst from said secondary stripper to said upper portion of primary stripper;

e. a catalyst regeneration means having an inlet connective with a catalyst outlet from at least one of said primary and said secondary stripping means, a regeneration gas inlet, a flue gas outlet, and an outlet for removal of regenerated catalyst; and f. a regenerated catalyst recycle means connective with said catalyst regeneration means, with said catalytic cracking reactor inlet and with said upper portion of said primary stripping zone.

19. The apparatus of claim 18 comprising catalyst recycle means adaptive to transport regenerated catalyst from said catalyst regeneration means to said stripped catalyst outlet of said primary stripping means.

20. The apparatus of claim 18 wherein the stripped catalyst outlet from said secondary stripping means discharges stripped catalyst from said secondary stripping means into said vapor phase of said primary stripping means.

21. The apparatus of claim 20 wherein at least a portion of said regenerated catalyst is recycled from the catalyst regeneration means to the catalyst outlet of said primary stripping means by passage through an indirect heat exchange means operatively connected with and contiguous to said primary stripping means.

22. The apparatus of claim 21 wherein at least a portion of regenerated catalyst added to the catalyst outlet of the primary stripping means is educted into said secondary stripping means via an eduction tube.

23. An apparatus for stripping spent fluidized catalytic cracking catalyst having an average particle size within the range of 10-100 microns comprising a stripping means having an inlet in an upper portion thereof for spent cracking catalyst, an inlet in a lower portion thereof for stripping gas, an outlet in an upper portion thereof for a stripper effluent vapor, and an outlet in a lower portion thereof for stripped catalyst, characterized by a stripped catalyst recycle means for recycling at least a portion of stripped catalyst removed from said lower portion of said stripping means back to said inlet in said upper portion of said stripping means.

* * * * *